(12) United States Patent
Liu et al.

(10) Patent No.: US 6,614,654 B2
(45) Date of Patent: Sep. 2, 2003

(54) FIXING APPARATUS FOR DATA STORAGE DEVICES

(75) Inventors: Yu-Tai Liu, Taipei (TW); Yun Lung Chen, Taipei (TW)

(73) Assignee: Hon Hai Precision Ind. Co., Ltd., Taipei (TW)

( * ) Notice: Subject to any disclaimer, the term of this patent is extended or adjusted under 35 U.S.C. 154(b) by 60 days.

(21) Appl. No.: 09/992,858

(22) Filed: Nov. 14, 2001

(65) Prior Publication Data

US 2003/0090869 A1 May 15, 2003

(51) Int. Cl.[7] .................................................. H05K 5/00
(52) U.S. Cl. ........................ 361/685; 248/609; 248/801; 312/223.3
(58) Field of Search ................................. 361/685, 801, 361/740, 724–727; 248/560, 581, 609–612; 312/223.1, 223.3, 227.2

(56) References Cited

U.S. PATENT DOCUMENTS 5,980,311 A * 11/1999 Campbell et al. ........... 439/517
6,220,878 B1 * 4/2001 Poplawski et al. ............ 439/92
6,318,679 B1 * 11/2001 Yang et al. ............... 312/223.2
6,442,020 B1 * 8/2002 Liu et al. .................... 361/683
6,473,313 B1 * 10/2002 Chen et al. ................. 361/801

* cited by examiner

Primary Examiner—Darren Schuberg
Assistant Examiner—Hung Van Duong
(74) Attorney, Agent, or Firm—Wei Te Chung

(57) ABSTRACT

A fixing apparatus for data storage devices (80) includes a drive bracket (20) and a fixing plate (40). The drive bracket includes two side panels (22, 24) defining grooves (26) for slidingly receiving screws (82) attached on the storage devices. The fixing plate is attached on one side panel. The fixing plate includes two arcuate handles (50), and two locking parts (54) each having a stop portion (55). In use, a screw of a storage device is sandwiched between the locking parts and blocked by the stop portions from moving out of the drive bracket. The storage device is thereby secured in the drive bracket. In removing the storage device, the handles are squeezed together to cause the locking parts to elastically move away from each other. The screw is thus released from the stop portions, and the storage device is readily slid out from the drive bracket.

15 Claims, 3 Drawing Sheets

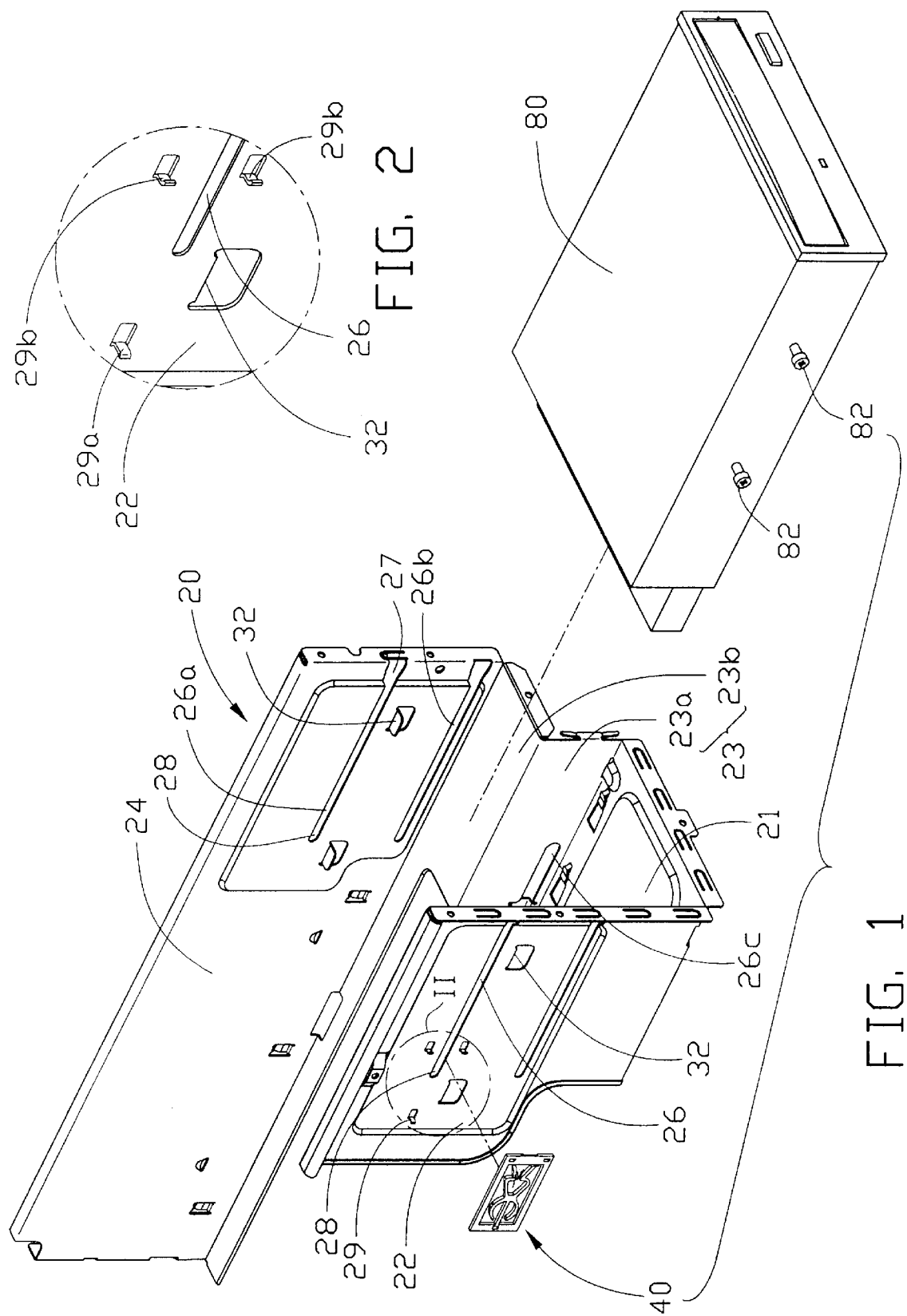

FIXING APPARATUS FOR DATA STORAGE DEVICES

BACKGROUND OF THE INVENTION

1. Field of the Invention

The present invention relates to fixing apparatuses, and particularly to fixing apparatuses that readily attach data storage devices in brackets.

2. Related Art

Various data storage devices are installed in computers for communication and handling of data. Such devices include, for example, hard disk drives, floppy disk drives and CD-ROM drives.

A conventional data storage device is directly attached to a computer enclosure with bolts. However, attachment with bolts is unduly complicated and time-consuming.

Thus rails have been developed to mount a data storage device to a computer enclosure. Such rails are disclosed in U. S. Pat. No. 5,510,955. A drive bracket forms two pairs of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and the guide rails is inserted into the drive bracket by sliding the guide rails along the leader rails. A pair of locking pins is then extended through the first and second coaxial holes to thereby secure the storage device within the drive bracket. However, the needed additional rails increase costs. Furthermore, mounting the rails to the data storage device with bolts is still unduly complicated and time-consuming.

SUMMARY OF THE INVENTION

Accordingly, an object of the present invention is to provide a fixing apparatus which can readily attach data storage devices within a drive bracket and which can readily release the data storage devices from the drive bracket.

To achieve the above-mentioned object, a fixing apparatus in accordance with the present invention comprises a drive bracket for installing data storage devices therein, and a fixing plate attached on one side of the drive bracket. The drive bracket comprises a pair of side panels. A plurality of grooves is defined in the side panels, for slidingly receiving screws that are attached on opposite sides of the storage devices. The fixing plate comprises a pair of arcuate handles and a pair of locking parts extending forwardly from front ends of the handles. The locking parts have a pair of front stop portions in front sections thereof respectively. In use, a screw of a storage device is sandwiched between the locking parts and blocked by the stop portions from moving out of the drive bracket. The storage device is thereby secured in the drive bracket. In removing the storage device, the handles are squeezed toward each other to cause the locking parts to elastically move away from each other. The screw is thus released from the stop portions, and the storage device is readily slid out from the drive bracket.

Other objects, advantages and novel features of the present invention will be drawn from the following detailed description of the preferred embodiment of the present invention with attached drawings, in which:

BRIEF DESCRIPTION OF THE DRAWINGS

FIG. 1 is an exploded view of a fixing apparatus in accordance with the present invention, together with a data storage device;

FIG. 2 is an enlarged view of a circled portion II of FIG. 1;

DESCRIPTION OF THE PREFERRED EMBODIMENT

Figure 3:
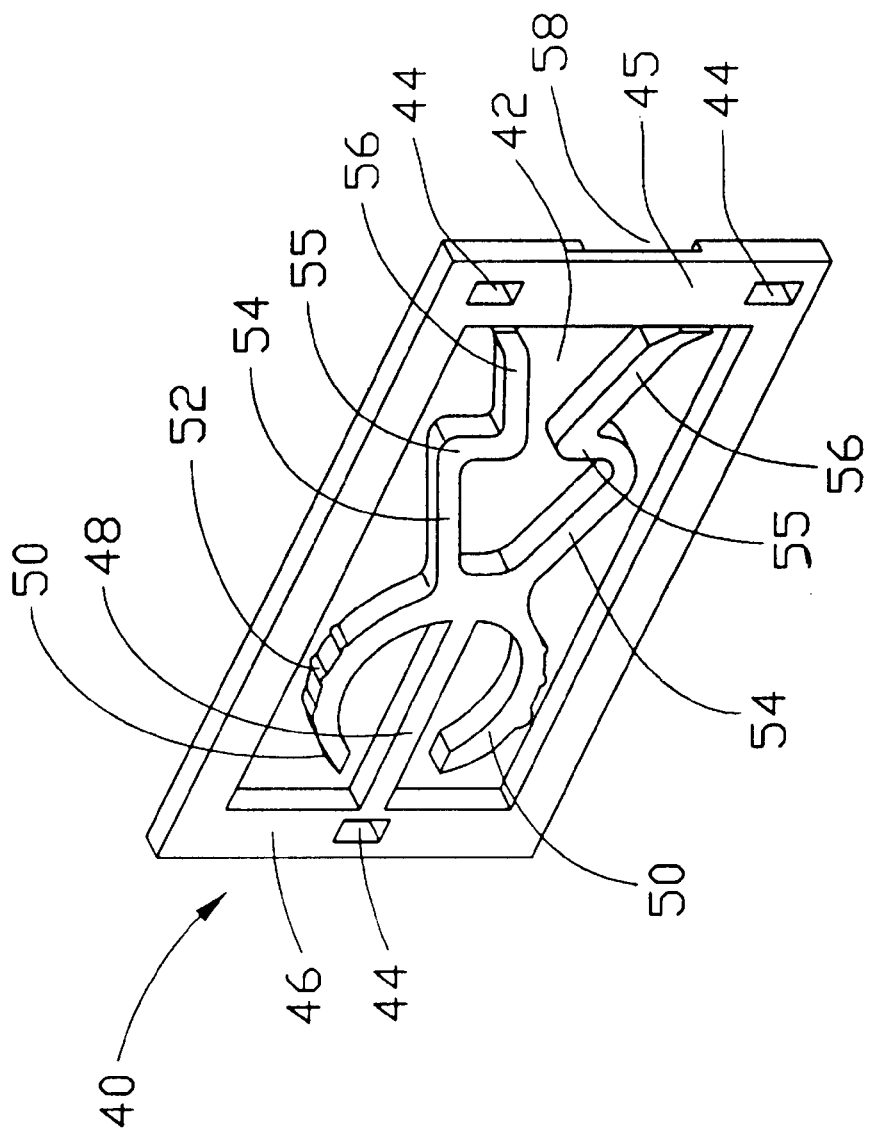
FIG. 3 is an enlarged view of a fixing plate of the fixing apparatus of FIG. 1.

Referring to the attached drawings, FIG. 1 shows a fixing apparatus in accordance with the present invention together with a data storage device 80. The fixing apparatus comprises a drive bracket 20 and a fixing plate 40. The data storage device 80 may be a CD-ROM drive, a hard disk drive, a floppy disk drive, and so on. For convenience, the data storage device 80 is hereinafter designated as a CD-ROM drive 80. A pair of screws 82 is threadedly engaged on each of opposite sides of the CD-ROM drive 80.

The drive bracket 20 comprises a bottom panel 21, a first side panel 22, a step 23, and a second side panel 24. The first side panel 22 extends perpendicularly upwardly from a side edge of the bottom panel 21. The step 23 comprises a vertical plate 23a extending perpendicularly upwardly from an opposite side edge of the bottom panel 21, and a horizontal plate 23b extending horizontally outwardly from a top edge of the vertical plate 23a. The second side panel 24 extends perpendicularly upwardly from a free edge of the horizontal plate 23b of the step 23. Three pairs of parallel grooves 26 are defined in the drive bracket 20. Each pair of grooves 26 is for guiding the CD-ROM drive 80 or another data storage device into the drive bracket 20. A pair of top grooves 26a is respectively defined in the first side panel 22 and a middle portion of the second side panel 24. A pair of middle grooves 26b is respectively defined in the first side panel 26, and in a bottom portion of the second side panel 24 slightly above the horizontal plate 23b of the step 23. A pair of bottom grooves 26c is respectively defined in the first side panel 22 and in the vertical plate 23a of the step 23, slightly above the bottom panel 21. Each groove 26 comprises a cul-de-sac end portion 28, and a widened entry portion 27 for facilitating sliding entry of the corresponding screw 82 of the CD-ROM drive 80 or another data storage device into the groove 26. Each first and second side panel 22, 24 is stamped inwardly to form a pair of support tabs 32 below the top grooves 26a, for supporting the CD-ROM drive 80.

Referring also to FIG. 2, the first side panel 22 is stamped outwardly to form three retaining tabs 29 near the end portion 28 of each groove 26 (only the retaining tabs 29 near the top groove 26a are shown in the drawings). A rear retaining tab 29a is located rearwardly of the end portion 28. An end of the retaining tab 29a is bent rearwardly. Two front retaining tabs 29b are located forward of the end portion 28, above and below the top groove 26a respectively. An end of each retaining tab 29b is bent forwardly.

Referring to FIG. 3, the fixing plate 40 is rectangular. A rectangular opening 42 is defined in a center portion of the fixing plate 40. Three spaced apertures 44 are defined in the fixing plate 40, corresponding to the retaining tabs 29 of the drive bracket 20. Two of the apertures 44 are defined in a front portion 45 of the fixing plate 40. The other aperture 44 is defined in a rear portion 46 of the fixing plate 40. A connecting bar 48 extends forwardly from a center of the rear portion 46 into the opening 42. A pair of arcuate handles 50 extends rearwardly from a front end of the connecting bar 48. The handles 50 are respectively located above and below the connecting bar 48. Each handle 50 forms a plurality of ribs 52, for facilitating manual operation. A pair of locking parts 54 extends forwardly from the front end of the connecting bar 48. The locking parts 54 firstly extend progressively away from each other and then extend directly toward each other. A pair of stop portions 55 is thereby formed in front sections of the locking parts 54 respectively. A pair of guiding strips 56 extends forwardly from free ends of the stop portions 55 respectively. The guiding strips 56 extend progressively away from each other, and terminate just short of the front portion 45. A cutout 58 is defined in one face of the front portion 45, between a front extremity of the fixing plate 40 and the opening 42. The cutout 58 is in communication with the opening 42. The cutout 58 is for facilitating sliding entry of the corresponding screw 82 of the CD-ROM 80 into the fixing plate 40.

Figure 4:
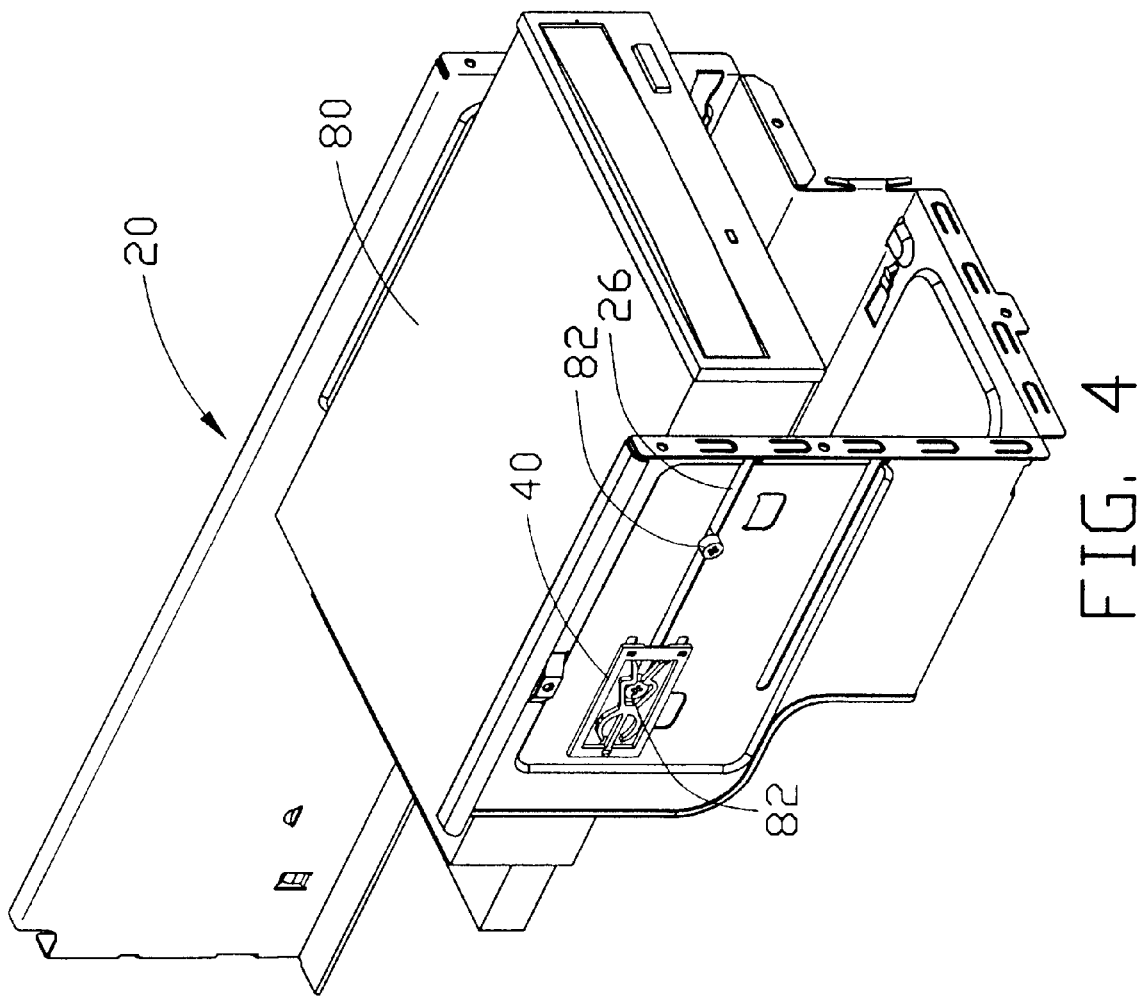
FIG. 4 is a fully assembled view of FIG. 1.

Referring also to FIG. 4, in assembly, the fixing plate 40 is attached on the first side panel 22 of the drive bracket 20. The retaining tabs 29 of the drive bracket 20 are engaged in the corresponding retaining apertures 44 of the fixing plate 40.

In use, the CD-ROM drive 80 is slid into the drive bracket 20. The screws 82 of the CD-ROM drive 80 enter the top grooves 26a of the drive bracket 20 via the entry portions 27. One screw 82 of two rearmost screws 82 of the CD-ROM drive 80 passes through the cutout 58 of the front portion 45 into the opening 42 of the fixing plate 40. The said one screw 82 presses the guiding strips 56 farther apart, and causes the locking parts 54 to elastically deform away from each other. When the rearmost screws 82 reach the end portions 28 of the top grooves 26a, the said one screw 82 has slid beyond the stop portions 55, allowing the locking parts 54 to elastically return to their original positions. The said one screw 82 is thus sandwiched between the locking parts 54 and blocked by the stop portions 55 from moving out of the drive bracket 20. The CD-ROM drive 80 is supported on the support tabs 32. The CD-ROM drive 80 is thus securely attached in the drive bracket 20. Similarly, the CD-ROM drive 80 or another data storage device can be received between the pair of middle grooves 26b and supported on the step 23, or received between the pair of bottom grooves 26c and supported on the bottom panel 21.

In removing the CD-ROM drive 80, the handles 50 of the fixing plate 40 are squeezed toward each other. This causes the locking parts 54 to elastically move away from each other. The said one screw 82 is thus released from the stop portions 55. The CD-ROM drive 80 is then readily slid out from the drive bracket 20.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A fixing apparatus for storage devices, the fixing apparatus comprising:
   a drive bracket for installing the storage devices therein, the drive bracket comprising a side panel defining a plurality of grooves for slidingly receiving screws attached on sides of the storage devices and thereby guiding the storage devices into the drive bracket; and
   a fixing plate attached on the side panel, the fixing plate having a pair of handles and a pair of stop portions for blocking a corresponding screw of a corresponding storage device from moving out of the drive bracket, thereby securing the corresponding storage device in the drive bracket, wherein when the handles are squeezed together, the stop portions move away from each other and thereby release the corresponding screw.

2. The fixing apparatus as claimed in claim 1, wherein the fixing plate defines an opening in a center thereof, a connecting bar extends forwardly from a rear portion of the fixing plate into the opening, the handles are arcuate and extend rearwardly from a front end of the connecting bar, and a pair of locking parts extend forwardly from the front end of the connecting bar, the locking parts firstly extending progressively away from each other and then extending toward each other to form the stop portions.

3. The fixing apparatus as claimed in claim 1, wherein the fixing plate defines a plurality of retaining apertures, the first side panel is stamped outwardly to form a plurality of retaining tabs, and the retaining tabs are engaged in the retaining apertures thereby securing the fixing plate to the first side panel.

4. The fixing apparatus as claimed in claim 1, wherein each of the grooves comprises a widened entry portion for facilitating sliding entry of a corresponding screw into the groove.

5. The fixing apparatus as claimed in claim 1, wherein each handle forms a plurality of ribs thereon for facilitating manual operation.

6. The fixing apparatus as claimed in claim 2, wherein the fixing plate further comprises a pair of guiding strips extending forwardly from free ends of the stop portions respectively.

7. The fixing apparatus as claimed in claim 2, wherein the fixing plate defines a cutout in one face of a front portion thereof, the cutout being in communication with the opening for facilitating entry of the corresponding screw into the fixing plate.

8. The fixing apparatus as claimed in claim 3, wherein at least one of the retaining tabs is located forward of an end portion of a proximate groove and has an end bent forwardly, and at least another one of the retaining tabs is located rearward of the end portion of the proximate groove and has an end bent rearwardly.

9. A fixing apparatus assembly comprising:
   a storage device having at least a pair of screws attached on opposite sides thereof; and
   a fixing apparatus comprising:
      a drive bracket receiving the storage device therein, the drive bracket comprising a pair of side panels each defining a groove to allow the screws to slide therein and thereby guide the storage device into the drive bracket;
      a fixing plate attached to one side panel near an end portion of a corresponding groove, the fixing plate having a pair of arcuate handles and a pair of locking parts, the locking parts having a pair of stop portions in front sections thereof, said locking parts sandwiching a corresponding screw therebetween, said stop portions blocking said corresponding screw from moving out of the drive bracket, thereby securing the storage device in the drive bracket, wherein when the handles are squeezed together, the locking parts move away from each other and thereby release the corresponding screw from the stop portions.

10. The fixing apparatus assembly as claimed in claim 9, wherein the fixing plate defines an opening in a center thereof to form a rear portion, the fixing plate further has a connecting bar extending forwardly from a center of the rear portion, the handles extend rearwardly from a front end of the connecting bar and are located above and below the connecting bar, the locking parts extend forwardly from the front end of the connecting bar, and the locking parts first extend progressively away from each other and then extend toward each other to form the stop portions.

11. The fixing apparatus as claimed in claim 9, wherein the fixing plate defines a plurality of retaining apertures, said one side panel is stamped outwardly to form a plurality of retaining tabs, and the retaining tabs are engaged in the retaining apertures thereby securing the fixing plate to said one side panel.

12. The fixing apparatus assembly as claimed in claim 10, wherein the fixing plate further has a pair of guiding strips extending from free ends of the stop portions respectively.

13. The fixing apparatus assembly as claimed in claim 10, wherein the fixing plate further forms a front portion, and a cutout is defined in one face of the front portion in communication with the opening for facilitating entry of the corresponding screw into the fixing plate.

14. The fixing apparatus as claimed in claim 10, wherein each handle forms a plurality of ribs thereon for facilitating manual operation.

15. The fixing apparatus as claimed in claim 11, wherein at least one of the retaining tabs is located forward of an end portion of a proximate groove and has an end bent forwardly, and at least another one of the retaining tabs is located rearward of the end portion of the proximate groove and has an end bent rearwardly.

* * * * *